US011483131B2

(12) United States Patent
Huang et al.

(10) Patent No.: US 11,483,131 B2
(45) Date of Patent: Oct. 25, 2022

(54) ABILITY TO FORGET IN BLOCKCHAIN

(71) Applicant: Digital Transaction Limited, Hong Kong (CN)

(72) Inventors: Ian Yuan Yuan Huang, Hong Kong (CN); Eric Zhiqiang Ma, Hong Kong (CN)

(73) Assignee: Eternal Paradise Limited, Mahe (SC)

( * ) Notice: Subject to any disclaimer, the term of this patent is extended or adjusted under 35 U.S.C. 154(b) by 367 days.

(21) Appl. No.: 16/739,092

(22) Filed: Jan. 9, 2020

(65) Prior Publication Data

US 2021/0216529 A1    Jul. 15, 2021

(51) Int. Cl.
| | | |
|---|---|---|
| *H04L 29/06* | (2006.01) | |
| *H04L 9/06* | (2006.01) | |
| *G06F 16/27* | (2019.01) | |
| *G06F 16/23* | (2019.01) | |
| *G06F 16/215* | (2019.01) | |
| *G06F 21/60* | (2013.01) | |
| *H04L 9/40* | (2022.01) | |
| *H04L 9/00* | (2022.01) | |

(52) U.S. Cl.
CPC .......... *H04L 9/0637* (2013.01); *G06F 16/215* (2019.01); *G06F 16/2365* (2019.01); *G06F 16/2379* (2019.01); *G06F 16/27* (2019.01); *G06F 21/602* (2013.01); *H04L 9/0643* (2013.01); *H04L 63/12* (2013.01); *H04L 9/50* (2022.05)

(58) Field of Classification Search
None
See application file for complete search history.

(56) References Cited

U.S. PATENT DOCUMENTS

2020/0380154 A1* 12/2020 Jayachandran ....... H04L 9/3239

FOREIGN PATENT DOCUMENTS

WO    WO-2020125839 A1 *  6/2020  ............. G06F 21/31

OTHER PUBLICATIONS

Tschuchnig, Maximilian Ernst et al. "Immutable and Democratic Data in Permissionless Peer-to-Peer Systems," 2019 Sixth International Conference on Software Defined Systems (SDS), IEEE, Jun. 2019, 6 pages. (Year: 2019).*
European Patent Office, Communication, Extended European Search Report issued for European Application No. 21150793.4, dated May 3, 2021, 7 pages.

(Continued)

*Primary Examiner* — Andrew J Steinle
(74) *Attorney, Agent, or Firm* — Norton Rose Fulbright US LLP (57) ABSTRACT

One example embodiment of the present invention is a method for conducting an imperative removal of at least one data record among peers to support ability to forget in blockchain. Each peer participating to a blockchain system has its own copy of a blockchain in a blockchain system. The method includes depositing the at least one data record to its designated data storage system by at least one peer; storing a cryptographic hashing pointer as a data item in a first block of its own copy of the blockchain by each peer; storing a deletion item in a second block of its own copy of the blockchain by each peer; and deleting the data record from the designated data storage system by each peer when the deletion item for the data record is found on the blockchain.

19 Claims, 6 Drawing Sheets

(56) References Cited

OTHER PUBLICATIONS

Tschuchnig, Maximilian Ernst et al. "Immutable and Democratic Data in Permissionless Peer-to-Peer Systems," 2019 Sixth International Conference on Software Defined Systems (SDS), IEEE, Jun. 2019, 6 pages.

Zhang, Mengyu et al. "PTAD: Provable and Traceable Assured Deletion in Cloud Storage," 2019 IEEE Symposium on Computers and Communications (ISCC), IEEE, Jun. 2019, 6 pages.

De Meijer, Carlos R.W. "Blockchain Versus GDPR and Who Should Adjust Most," Oct. 9, 2018, Retrieved from the Internet: URL:https://www.finextra.com/blogposting/16102/blockchain-versus-gdpr-and-who-should-adjust-most [retrieved on Aug. 3, 2020]; 11 pages.

* cited by examiner

ABILITY TO FORGET IN BLOCKCHAIN

FIELD OF INVENTION

This invention relates to a method of handling data using a blockchain system.

BACKGROUND OF INVENTION

Many information systems store data that are both private and confidential, such as personal information, online transactions, medical and tax records, passwords for bank accounts and emails. It is imperative that this type of data do not leak to the public or to a wrong person, as the consequence can be extremely damaging. There is also a requirement, either by law or by business practice, that certain data must be destroyed after a certain period of time.

Traditional methods for protecting confidential information rely on upholding system integrity. If a computer is safe from hackers and malicious software, then so is its data. However, ensuring integrity in today's interconnected world, where the same data may be replicated onto many servers in different locations, is exceedingly difficult. Hence, there is a need for an advanced and robust method and the "ability to forget" for imperative removal of data records by authorized persons.

SUMMARY OF INVENTION

One example embodiment is a method for conducting an imperative removal of at least one data record among peers. Each peer participating to a blockchain system has its own copy of a blockchain in a blockchain system. The method includes depositing the at least one data record to its designated data storage system by at least one peer; storing a cryptographic hashing pointer as a data item in a first block of its own copy of the blockchain by each peer; storing a deletion item in a second block of its own copy of the blockchain by each peer; and deleting the data record from the designated data storage system by each peer when the deletion item for the data record is found on the blockchain. The pointer uniquely identifies the data record in its designated data storage system. The deletion item indicates that the data record is marked for deletion.

In another example embodiment, it is a method for conducting an imperative removal of a dataset among peers. Each peer participating to a blockchain system has its own copy of a blockchain in the blockchain system. The method includes depositing a dataset to its designated data storage system by at least one peer; storing a cryptographic hashing pointer as a data item in a first block of its own copy of the blockchain by each peer; storing a plurality of deletion requests in a plurality of blocks of its own copy of the blockchain by each peer; storing a deletion item in a second block of its own copy of the blockchain by each peer; and deleting the dataset from the at least one data storage system by at least one peer when the deletion item for the dataset is found on the blockchain. The dataset includes a plurality of data records. The pointer points to the dataset in its designated data storage system. Each deletion request indicates that a data record in the dataset is marked for deletion. The deletion item indicates that all the data records in the dataset have received their own deletion requests and are marked for deletion.

An example embodiment of the present invention relates to an information processing system that conducts an imperative removal of at least one digital record. The information processing system includes at least one data storage system that stores the digital record; at least one blockchain system and a processor and a memory storing instructions and in electronic communication with the processor. The blockchain system stores a blockchain including a first block and a second block with the first block storing a cryptographic hashing pointer as a data item pointing to the digital record in the data storage system and the second block storing a deletion item indicating that the digital record is marked for deletion from the data storage system. The first block precedes the second block in the blockchain. The processor is configured to execute the instructions to delete the digital record from the data storage system upon identifying the deletion item in the blockchain.

DETAILED DESCRIPTION OF THE PREFERRED EMBODIMENTS

As used herein, "comprising" means including the following elements but not excluding others.

As used herein, "blockchain" refers to a chain of blocks linked using cryptography. Each block contains a hash pointer pointing to the previous block. Given the latest block, it is possible to verify the integrity of the previous blocks linked together in the chain. A blockchain database, thus, retains the complete history of all assets and instructions executed since the very first one, i.e. the genesis block, making its data verifiable and independently auditable.

As used herein, "the first block" is not necessarily the genesis block of the blockchain and "the second block" is not necessarily the block next to the first block.

As used herein, "the pointer" facilitates a user or operator to identify a piece of information. Thus, if the piece of information is stored in a computer memory, then one pointer is the memory address of that piece of information. If the piece of information is stored in a file in a file server, then one pointer is the directory path and filename of that file. If the piece of information is stored in a record in a relational database table. Then one pointer is the name of the relational table plus the offset to that record.

As used herein, "hashing pointer" is a hash value calculated from the data record where the hash value can be used to uniquely identify the record in the storage system. A cryptographic hashing pointer is a hashing pointer that uniquely identifies a data record in the data storage system and has common cryptographic hashing function properties: collision-free, hiding, etc. The hashing pointer can be used together with other addressing keys or identifiers to identify a data record for performance or other reasons although the hashing pointer itself can be used alone to address a data record. As such, if the data record exists in the data storage system, the data integrity can be verified. Also, the data can be deleted, but cannot be modified under the same assumption of the blockchain.

There are many instances where sensitive data must be removed in an irrecoverable manner. Sometimes this is mandated by law and in other occasions it is by agreement between parties. We refer to this as imperative removal. However, when the data is no longer available in the data storage, it is difficult to track whether the data was removed from the data storage and whether the data were ever presented in the data storage. Furthermore, existing blockchain technology does not provide any mechanism for removing data from its chain. Example embodiments of the present invention enable a deletion operation to data that is trackable. The cryptographic hashing pointers in the blockchain are not affected when the data record is removed.

Example embodiments of the present invention provide a method to store, share, search and delete data using blockchain. Special architectural level improvements are also disclosed to optimize system performance without compromising system integrity, so that the merit of verifiable transaction history in blockchain is preserved while the system response time will not deteriorate when the blockchain becomes longer and longer.

To safeguard the confidentiality, integrity and availability of digital record, example embodiments provide an information processing system that can add, modify and dispose digital record, data or information in a verifiable, non-repudiable manner.

Example embodiments make blockchain available for data handling. Since the integrity of the blockchain can be verified, the integrity of the history of the data record can be verified as well.

Figure 1:
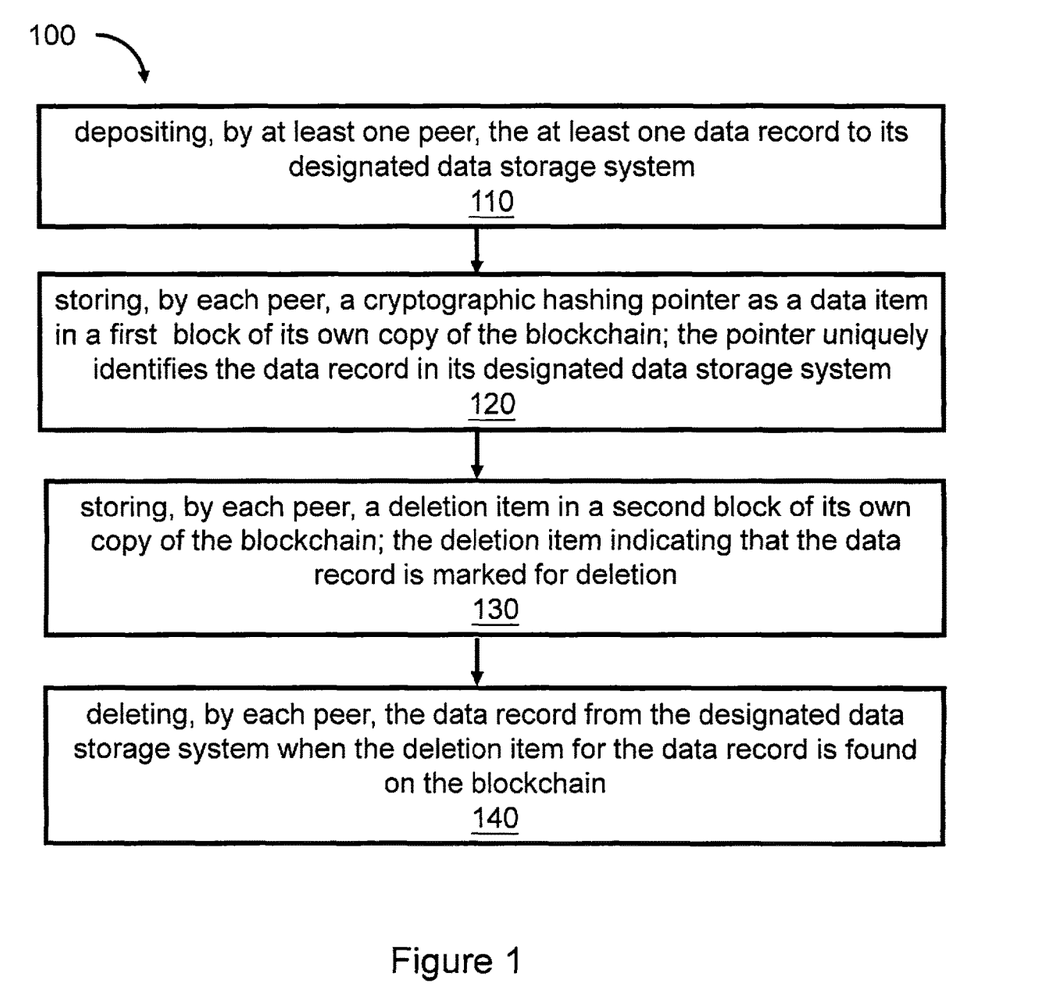
FIG. 1 shows a method for conducting an imperative removal of at least one data record among peers in accordance with an example embodiment.

Example embodiment provides a method 100 for conducting an imperative removal of at least one data record among peers as shown in FIG. 1. Each peer participating to a blockchain system has its own copy of a blockchain in a blockchain system.

Block 110 shows depositing, by at least one peer, the at least one data record to its designated data storage system.

Block 120 shows storing, by each peer, a cryptographic hashing pointer as a data item in a first block of its own copy of the blockchain.

By way of example, the cryptographic hashing pointer uniquely identifies and addresses the record in the data storage system, it points to the data record in its designated data storage system.

Block 130 shows storing, by each peer, a deletion item in a second block of its own copy of the blockchain.

By way of example, the deletion item indicates that the data record is marked for deletion.

Block 140 shows deleting, by each peer, the data record from the designated data storage system when the deletion item for the data record is found on the blockchain.

By way of example, the method further includes returning, by each peer, upon receiving a query request for the data record, a response indicating that the data record was removed and is not available in the data storage system when the deletion item for the data record is found on the blockchain.

By way of example, the method includes searching, by each peer, upon receiving a query request for the data record, a data item referencing the data record from the last block of the blockchain towards the genesis block of the blockchain.

By way of example, the method includes adding, by the at least one peer, a removal record in a block of the blockchain, in which the removal record indicates the data record was removed in the data storage system.

By way of example, the method includes storing simultaneously, by the peer, a cryptographic hashing pointer for a particular record in the data storage system and also to a state store. In one embodiment, the state store is a key-value store whereby each key can uniquely identify the cryptographic hashing pointer. Upon receiving a query request, the information unit accesses the key to retrieve the cryptographic hashing pointer from the state store, and use the cryptographic hashing pointer to retrieve the particular record. In another embodiment, the hashing pointer is stored together with the data item under another uniquely generated key in the state store. Upon receiving a query request, the information unit accesses the key to retrieve the other uniquely generated key and the hashing pointer, and use the retrieved key to retrieve the particular record and use the cryptographic hashing pointer to verify the record.

Figure 2:
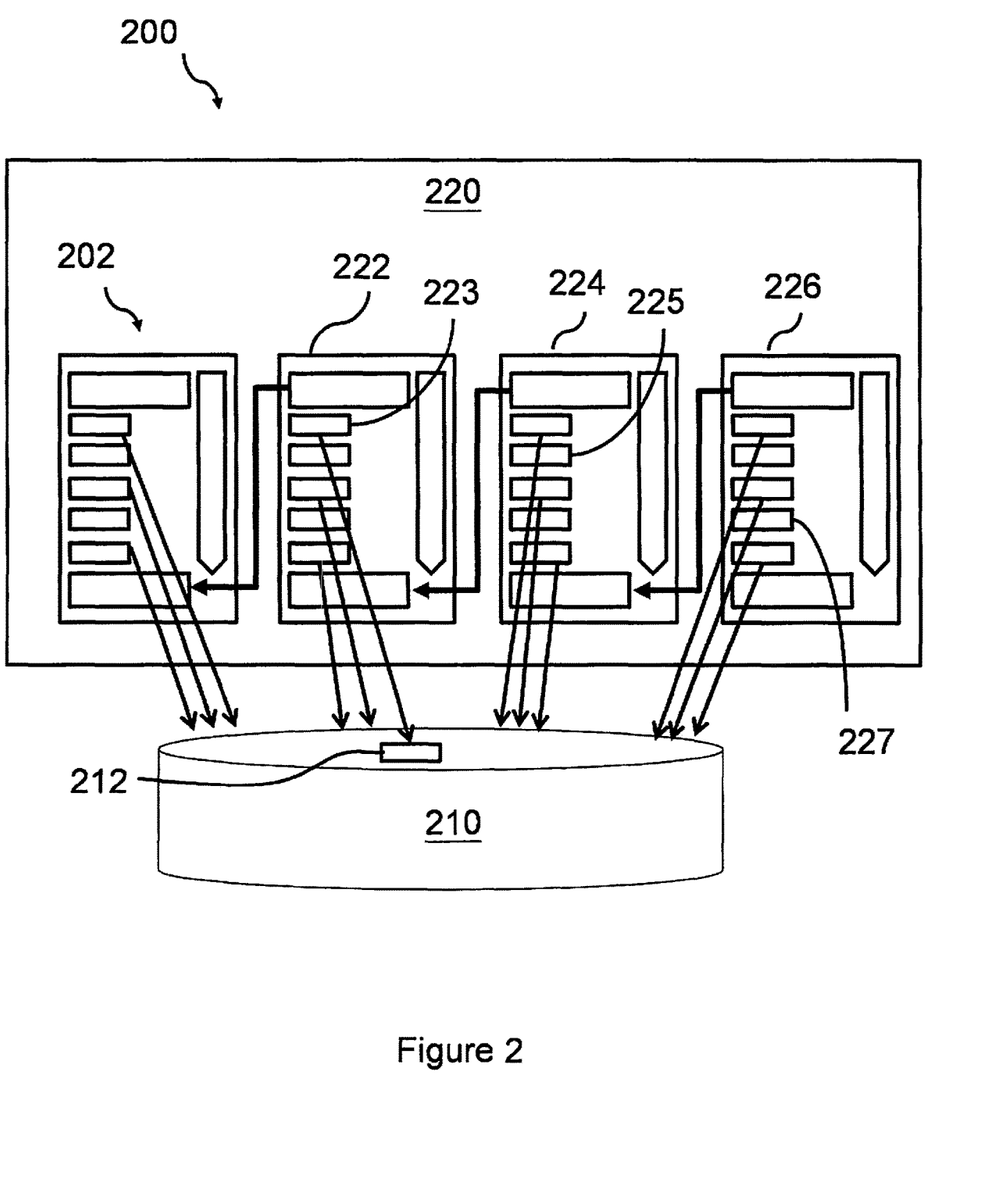
FIG. 2 shows an information processing system in accordance with an example embodiment.

Referring now to FIG. 2, an example embodiment is an information processing system comprising at least one information processing unit 200. Each information processing unit 200 comprises a processor and a memory (not shown in FIG. 2), a blockchain 220 residing in the memory storage area, and an interface to access a data storage system 210. The data storage system 210 stores a plurality of data records. The blockchain comprises a plurality of blocks. Each block stores a plurality of data items and a hash pointer pointing to the previous block. By way of an example as shown in FIG. 2, block 202 is the genius block of blockchain 220. Some of the data items are cryptographic hashing pointers pointing to the corresponding data records in the data storage system 210. For example, when the information processing unit 200 receives a new data record 212, it first stores it in the data storage system 210. Then a cryptographic hashing pointer 223 that points to this data record is created. The cryptographic hashing pointer 223 is then stored as a data item in a block 222 of the blockchain 220. In the following discussion, we refer block 222 as the first block. Upon receiving an instruction to access the data record, the information processing unit 220 will first retrieve the cryptographic hashing pointer 223 of block 222, and then access the data record 212.

When the information processing unit 220 receives an instruction to delete the data record 212, a deletion item 225 is first created and stored in a second block 224 of the blockchain 220. The deletion item 225 indicates that the data record 212 is marked for deletion from the data storage system 210. Meanwhile, the information processing unit 220 also issues command to delete data record 212 from the data storage system 210.

It should be noted that the cryptographic hashing pointer 223 and deletion item 225 are distinct data items. They may reside in the same block (i.e. data item 225 resides in block 222) or in different blocks but cryptographic hashing pointer 223 generally precedes deletion item 225 as a data record can only be deleted after it is created.

In one embodiment, an information processing system may comprise a plurality of information processing unit 200. Each unit, hereafter referred to as peer, may have different processing and memory configurations, but they all have a blockchain of similar structure and content, and they can access a data storage system 210. In an embodiment, multiple peers share the same data storage system 210 while in other embodiment, each peer has its own data storage system. When a blockchain in one peer is modified, the modification is broadcasted to all other peers so all peers will perform the same modification at its own pace. However, due to the nature of asynchronous operation among peers, some peer may receive the modification instruction later and complete their modification later than others. As a result, there may be inconsistency about whether the data record was deleted among the peers within a short period of time when peers are updating their own blockchains and data storage systems. After this transient period, all blockchains in all peers will have the same content. During this transient period, it is possible that for one peer, a data record has already been marked for deletion while for another peer, it is still available for retrieval.

In one embodiment, when a query request of a particular data record is received, the peer will first check if a deletion item 225 of that data record has already been created in its blockchain. If so, it will report that the data record is not available.

In a further embodiment, each peer further issues a delete-confirmed message after the data record 212 has actually been deleted from the data storage system 210.

In one embodiment, the delete-confirmed message is sent back to the requester that request to delete the data record. When the requester receives all delete-confirmed message from all peers, then the requester creates a removal record data item 227 in a block 226.

In another embodiment, the delete-confirmed message is sent to a central administration module of this information processing system. Upon receiving all delete-confirmed message from all peers, the central administration module creates a removal record data item 227 in a block 226.

By way of example, when the deletion item is created in the blockchain, at least one peer sends a removal command to the central administration module. The central administration module removes the record in the data storage system 210, and replies a removal confirmation indicating that the data record was removed in the data storage system 210 to the at least one peer.

By way of example, the removal record confirms the data record is removed from the data storage system 210 and the removal record indicates that the data record existed before but no longer available in the data storage system 210.

As mentioned earlier, when a query request for a data record 212 is received, the peer will first check if a deletion item 225 of that data record has already been created. As the deletion item 225 resides in a block 224 that is behind block 222 that contains the cryptographic hashing pointer 223, one way to achieve that is to search the blockchain backward— i.e. starting from the last block and traversing towards the genius block 202. As such, the search will encounter the deletion item 225 first before reaching the cryptographic hashing pointer 223. In one implementation, this can be achieved by incorporating reverse link pointers in every block of the blockchain 220 so that once a pointer pointing to the last block of the chain is available, one can traverse back to the genesis block 202. In another alternative implementation, for each updated data record for one data item, the updated record stores a pointer to the previous data record for the data item so that the history of a data item can be retrieved back traversing following the data item records' backwards links. In another alternative implementation, the data record for one data item stores backward points to all the previous data records for the data item. Another alternative is to use a state store 310 as shown in FIG. 3.

Figure 3:
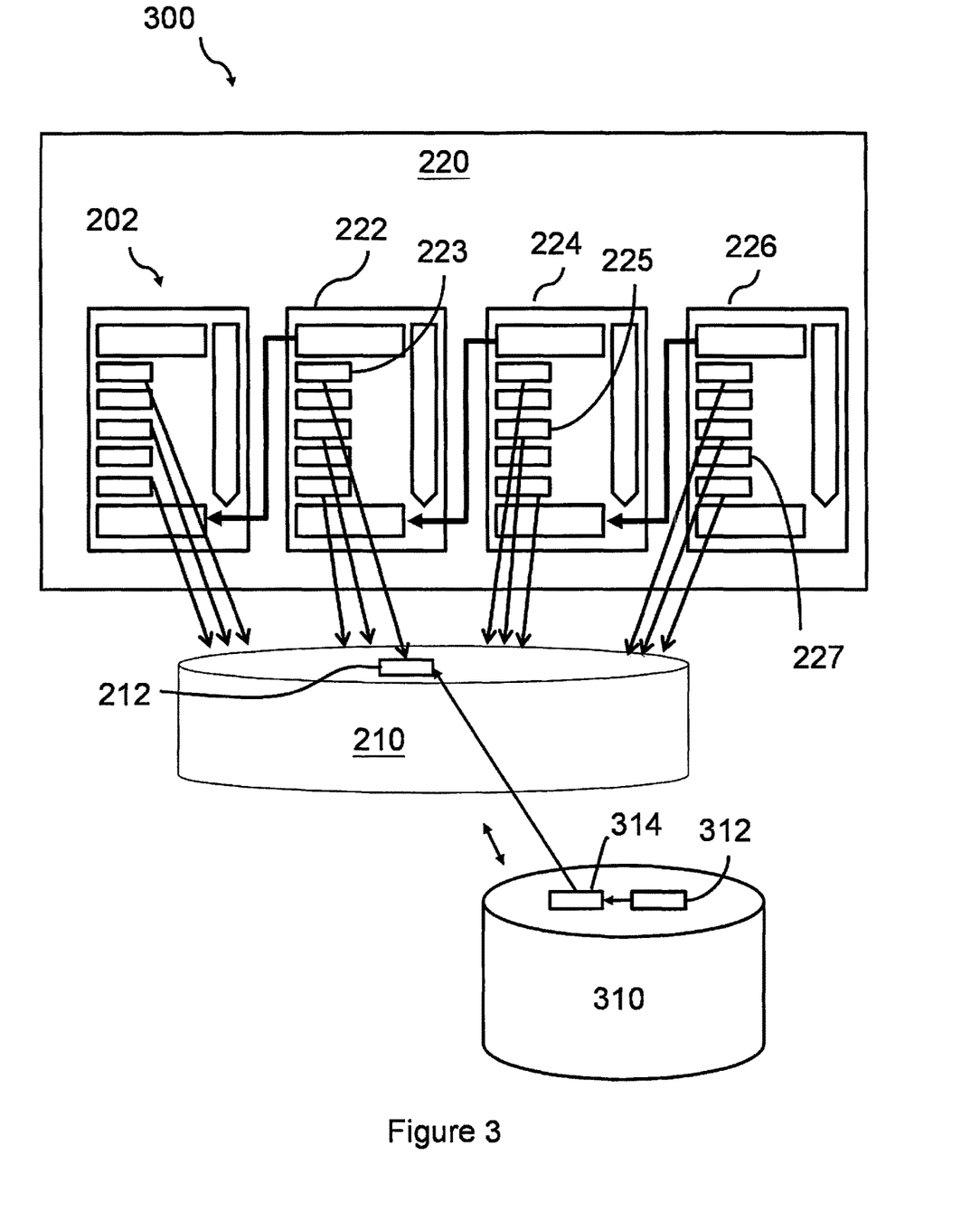
FIG. 3 shows an information processing system with a state store in accordance with an example embodiment.

FIG. 3 shows an information processing system in another example embodiment, in which parts corresponding to those in FIG. 2 are marked with the same reference numerals and characters and no detailed description will be repeated. In FIG. 3, the information processing unit 300 is the same as that of FIG. 2 except that a state store 310 is added to its architecture. By way of an example, the state store 310 can access the blockchain 220 and it also uses the same cryptographic hashing pointers to access to the data records in the data storage system 210. Whereas the blockchain 220 captures the historical transactions on data records, the state store gives a snapshot of the latest state of each data record. So when a new data record 212 is added to the data storage system 210, and a cryptographic hashing pointer 223 pointing to data record 212 is added to a data item 223 of block 222, and the same cryptographic hashing pointer is stored in the state store 310. In one embodiment, the state store is a key-value store whereby each key can uniquely identify the cryptographic hashing pointer. As such, a key-value pair comprising key 312 and cryptographic hashing pointer 314 is created. When the peer receives a delete instruction to delete the data record 212, the key 312 and the corresponding cryptographic hashing pointer 314 in the state store 310 are deleted also.

When the peer receives a query request for data record 212, information processing unit 300 will access the state store 310, and attempt to use the corresponding key 312 to obtain the cryptographic hashing pointer 314. If the key 312 is available, it then retrieves the data record 212 to the query requester. Otherwise, the data record must have been deleted and the state store returns a respond indicating the data record was removed or not available, the peer reports to the query requester that the data is not available.

With this arrangement, there is no need for the information processing unit 300 to traverse the blockchain 220 from the last block backward as discussed in the previous paragraph in order to access a data record. Hence adding a state store 310 can greatly speed up the system response time. On the other hand, the state store only captures the latest information whether a data record is available or not, it does not show when and by whom the data record is created or deleted. Such information is retained in the blockchain 220. So the blockchain 220 provides verifiable transaction history on each data record while the state store offers fast access to retrieve them.

In one embodiment, at any given time, the content in the state store 310 can be rebuilt from the blockchain 220.

Figure 4:
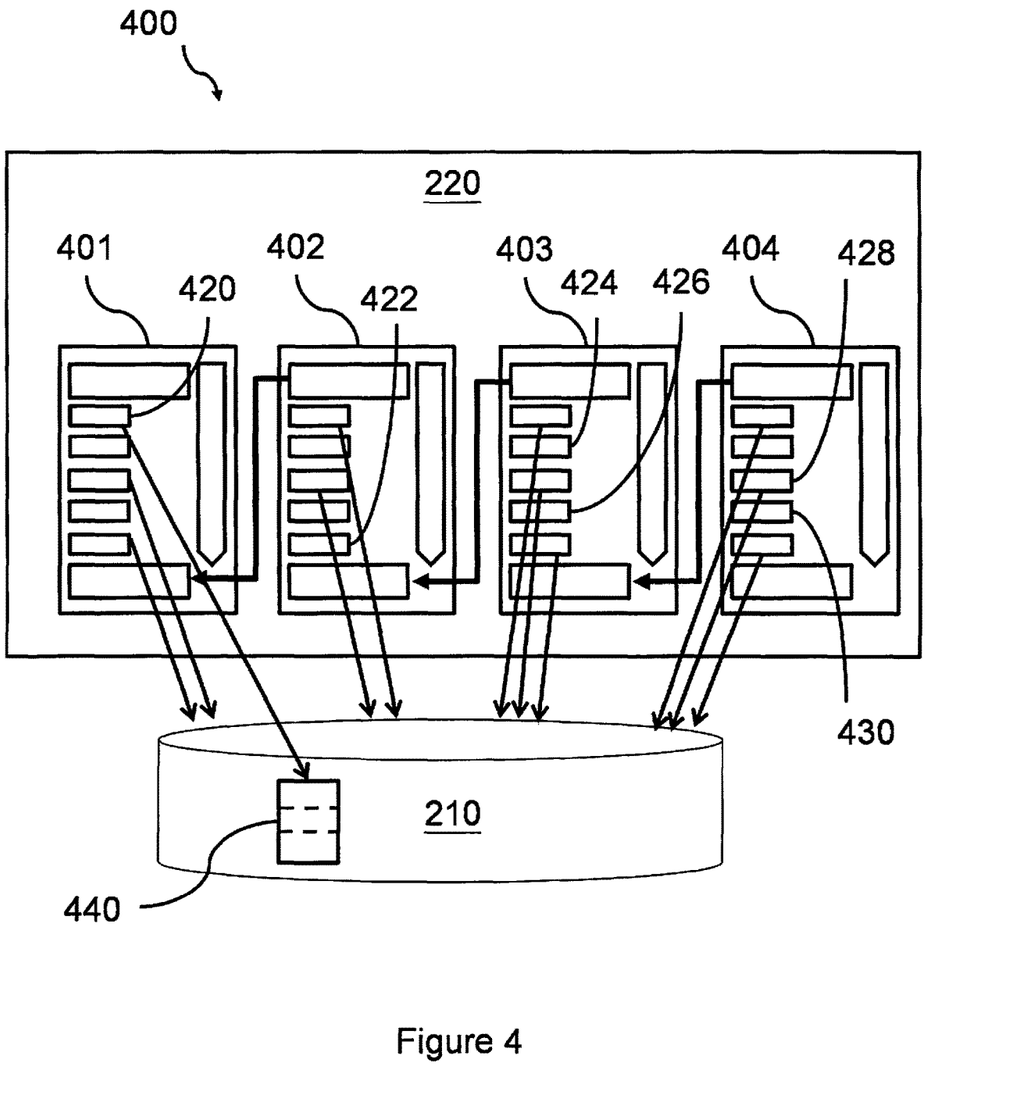
FIG. 4 shows another information processing system in accordance with an example embodiment.

FIG. 4 shows an information processing unit 400 in another example embodiment, in which parts corresponding to those in FIG. 2 are marked with the same reference numerals and characters and no detailed description will be repeated. The information processing unit 400 comprises a processor and a memory, a blockchain 220 and an interface for accessing a data storage system 210, as described in FIG. 2. In this configuration, some data records are grouped together to form a data set, and a single cryptographic hashing pointer is created to point to the dataset. By way of example, data records A, B, and C (not shown in FIG. 4) are group together and stored in the data storage system 210 as a dataset or a digital record 440. Block 401 includes a cryptographic hashing pointer 420 that points to the dataset 440.

When a data record occupies only a few bytes of memory, but a cryptographic hashing pointer requires more storage space than the data record, it will save storage space if a few short data records are grouped together to form a dataset and a cryptographic hashing pointer is created to point to that dataset. In this situation, the operations on dataset creation, query and deletion are similar to the previous case but are slightly modified to handle dataset instead of individual data records.

By way of example, a dataset is created by grouping a plurality of short data records together. The criteria on how to group and what to group can be determined to suit a particular application environment and is immaterial to this invention. By way of example, the information processing unit 400 registers that dataset 440 consists of three data records—A, B and C (not shown in FIG. 4).

By way of example, when a query request for a particular data record, say A, is received, the information processing unit 400 first identifies that data record A resides in dataset 400. After retrieve the cryptographic hashing pointer 420 from block 401, it accesses the dataset 440 from the data storage system 210, and then extracts data record A from dataset 440 and report to the requester.

By way of an example, when a deletion request is received to delete data record A, the information processing unit 400 will add a deletion request item 422 in block 402 of blockchain 220, indicating that data record A is marked for deletion. However, it will not issue an instruction to delete dataset 440 from the data storage system 210 as other data records in the dataset 440 are still available for query. In a similar manner, when a deletion request for deleting data record B is received, another deletion request item 424 is created in block 403 to signal that data record B is marked for deletion. Eventually, when a request to delete data record C is received, another deletion request item 426 is created in block 403, marking that data record C is to be deleted. As all the data records in the dataset 440 are marked for deletion, the information processing unit 440 then proceed to delete the dataset 440 from the data storage system 210. Meanwhile, it will also create a deletion item 428 in block 404, indicating that the whole dataset 440 and its associated data records are deleted and are no longer available.

As discussed in previous paragraphs, an information processing system may have a plurality of information processing unit 400 operating asynchronously among each other. By way of an example, after the deletion item 428 is created by each peer, it will send a removal confirmation message to either the deletion requestor or a central administration module of this information processing system that the dataset 440 is deleted. When the requester or the central administrator receives all the removal confirmation messages from all the peers, a removal record 430 is create as a new data item in block 404 of blockchain 220.

By way of example, the removal record confirms that the dataset 440 is removed and is no longer available from all the peers.

By way of example, each peer is configured to return a response to a query request. The information processing unit 400 first check if a deletion request item for that data record exists in its blockchain 220. If found, it indicates that the data record is marked for deletion, so it replies to the requestor that the data record in the dataset is not available. Otherwise, it retrieves the cryptographic hashing pointer to locate the dataset and then extracts the relevant data record from the dataset to report back to the requestor.

Figure 5:
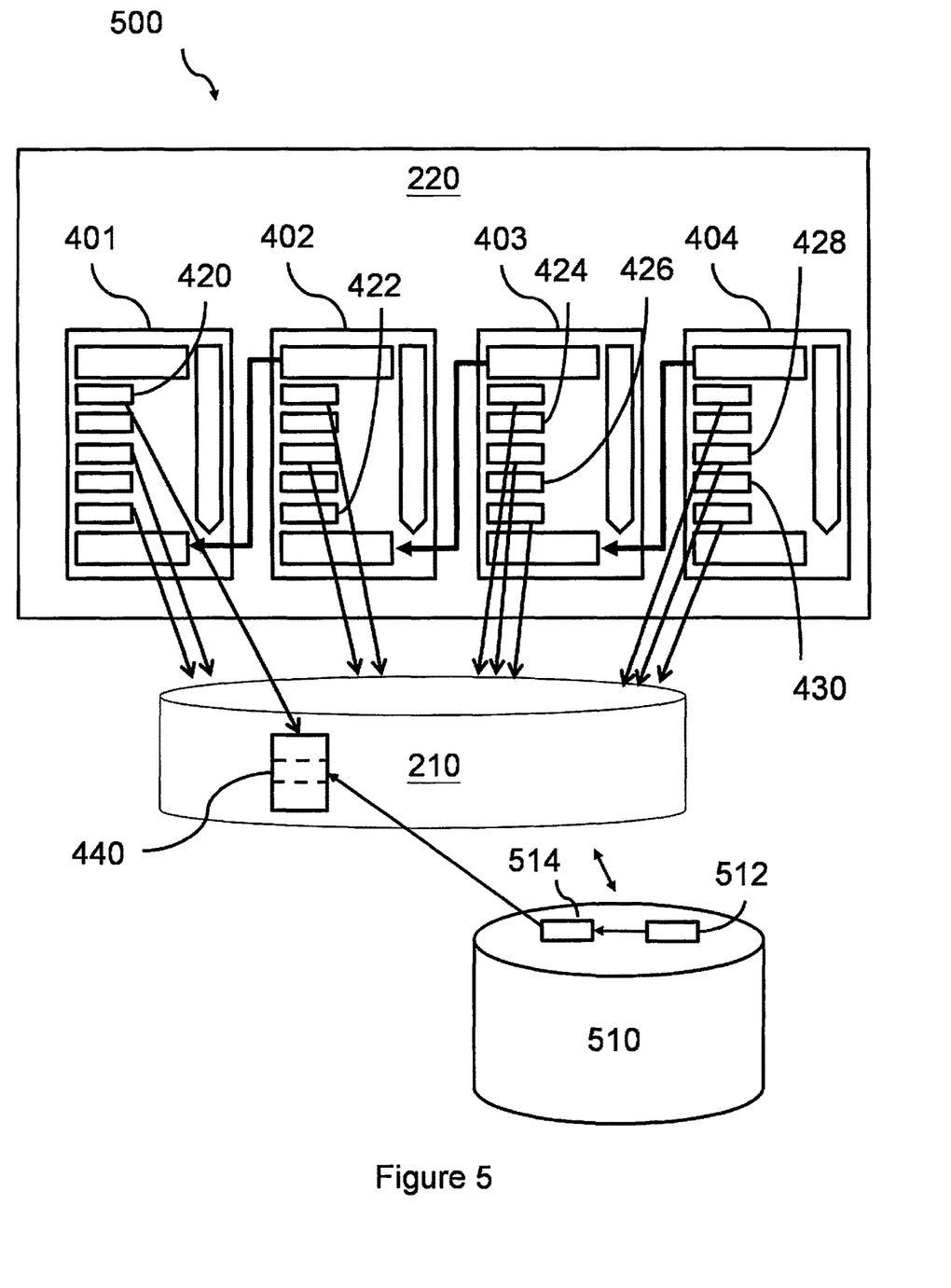
FIG. 5 shows another information processing with a state store system in accordance with an example embodiment.

FIG. 5 shows an information processing unit 500 in another example embodiment, in which parts corresponding to those in FIG. 2 to FIG. 4 are marked with the same reference numerals and characters and no detailed description will be repeated. The information processing unit 500 is similar to information processing unit 400 except that a state store 510 is added. In essence, the state store 510 captures a snapshot of the latest state of each dataset and data record. The function and characteristic of the state store 510 is similar to that of state store 310 of FIG. 3 described earlier. It operates the same way as state store 310 with the extension that it not only works with data records but also datasets that groups a few data records together. By way of an example, a key 512 of the cryptographic hashing pointer 514 pointing to dataset 440 is kept in its state store 510. Otherwise, for the query requests and deletion requests, information processing unit 500 follows same the operation principles as mentioned in FIG. 4 and is not repeated here.

Figure 6:
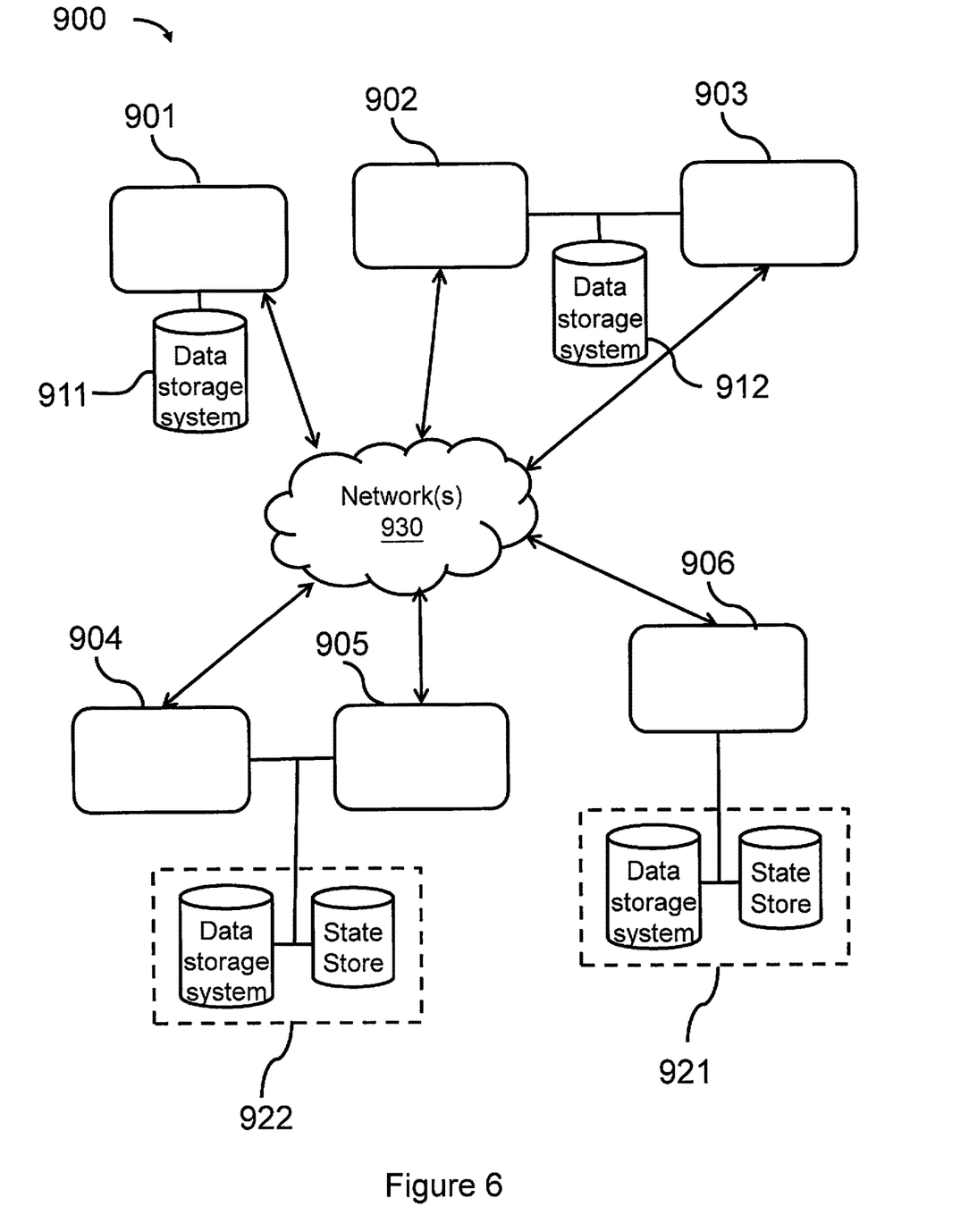
FIG. 6 shows an information processing system in accordance with an example embodiment.

Example embodiment is an information processing system 900 as shown in FIG. 6. By way of an example, the information processing system 900 has a plurality number of information processing units 901, 902, 903, 904, 905 and 906. Each information processing unit, also referred to as peer, is a computer system having their own processor and memory. They are interconnected to a network 930 and each information processing unit in this information processing system 900 stores its own copy of a blockchain in its memory. Some information processing units, such as 901, have their own data storage system 911, while others such as information processing units 902 and 903, share a data storage system 912. Furthermore, information processing unit 906 not only has its own data storage system but also a state store, which together constitute an external store 921. Likewise, information units 904 and 905 share an external store 922. The functions and properties of the state store and the data storage system are discussed above. It should be noted that FIG. 6 shows an exemplary, plausible configuration of an information processing system 900. Those skilled in the art will appreciate that the actual configuration, the number of peers, the sharing of data storage systems and state stores depend on the specific application requirement and can be extended or reconfigured as needed.

It should be noted that blocks 222, 224 and 226 in FIG. 2 and FIG. 3, and blocks 401, 402, 403 and 404 appears to be one following immediately the other. In actual operation, they need not be adjacent to each other. They are shown in this way for clarity purpose only. In actual operation, there may be other blocks in between them. Also, items in the blocks, such as the cryptographic hashing pointers, the deletion request items, deletion items and the removal records may reside in the same block or in separate blocks, or some in one block and others dispersed in other blocks. Their placement arrangements in these figures are for clarity purpose.

By way of example, the blockchain 220 is a public blockchain which can be read by the general public.

By way of example, the blockchain 220 is a permissive blockchain in which the read or write permission is controlled.

The information processing units, and the processing methods of the present disclosure may be implemented in the form of a software application running on a computer system. Further, portions of the methods may be executed on one such computer system, while the other portions are executed on one or more other such computer systems. Examples of the computer system include a mainframe, personal computer, handheld computer, server, etc. The software application may be stored on a recording media locally accessible by the computer system and accessible via a hard wired or wireless connection to a network, for example, a local area network, or the Internet.

The computer system may include, for example, a processor, random access memory (RAM), a printer interface, a display unit, a local area network (LAN) data transmission controller, a LAN interface, a network controller, an internal bus, and one or more input devices, for example, a keyboard, mouse etc. The computer system can be connected to a data storage device.

The processor can be a central processing unit (CPU), microprocessor, microcontrollers, digital signal processor (DSP), field programmable gate arrays (FPGA), application-specific integrated circuits (ASIC), etc., for controlling the overall operation of memory (such as random access memory (RAM) for temporary data storage, read only memory (ROM) for permanent data storage, and firmware). One or more processors can communicate with each other and memory and perform operations and tasks that implement one or more blocks of the flow diagrams discussed herein.

The memory, for example, stores applications, data, programs, algorithms (including software to implement or assist in implementing example embodiments) and other data. Memory can include dynamic or static random-access memory (DRAM or SRAM) or read-only memory such as Erasable and Programmable Read-Only Memories (EPROMs), Electrically Erasable and Programmable Read-Only Memories (EEPROMs) and flash memories, as well as other memory technologies, singly or jointly combined. The memory, for example, stores applications, data, programs, algorithms (including software to implement or assist in implementing example embodiments) and other data.

The data storage system typically includes persistence storage such as magnetic disks such as fixed and removable disks; other magnetic media including tape; optical media such as Compact Disks (CDs) or Digital Versatile Disks (DVDs), and semiconductor storage devices such as flash memory cards, solid-state drive, EPROMs, EEPROMS or other storage technologies, singly or in combination. Note that the instructions of the software discussed above can be provided on computer-readable or machine-readable storage medium, or alternatively, can be provided on multiple computer-readable or machine-readable storage media distributed in a large system having possibly plural nodes. Such computer-readable or machine-readable medium or media is (are) considered to be part of an article (or article of manufacture). An article or article of manufacture can refer to any manufactured single component or multiple components.

Methods discussed herein can be executed and/or made by a user, a user agent (including machine learning agents and intelligent user agents), a software application, an electronic device, a computer, firmware, hardware, a process, a computer system, and/or an intelligent personal assistant. Furthermore, blocks and/or methods discussed herein can be executed automatically with or without instruction from a user.

It should be understood for those skilled in the art that the division between hardware and software is a conceptual division for ease of understanding and is somewhat arbitrary. Moreover, it will be appreciated that peripheral devices in one computer installation may be integrated to the host computer in another. Furthermore, the application software systems may be executed in a distributed computing environment. The software program and its related databases can be stored in a separate file server or database server and is transferred to the local host for execution. Those skilled in the art will appreciate that alternative embodiments can be adopted to implement the present invention.

The exemplary embodiments of the present invention are thus fully described. Although the description referred to particular embodiments, it will be clear to one skilled in the art that the present invention may be practiced with variation of these specific details. Hence this invention should not be construed as limited to the embodiments set forth herein.

For example, the entities or peers carry out the methods of the example embodiments may be government organization, banks, companies, departments or offices within a national or multi-national corporation. Together they form a community to participate in the blockchain system to store, share, search and delete digital information. Every peer the runs the blockchain and acknowledge receipt of the deletion item of the example embodiment should respect, accept and cooperate with the semantics of the method or system of the example embodiment and delete the corresponding digital record or dataset.

Methods discussed within different figures can be added to or exchanged with methods in other figures. Further, specific numerical data values (such as specific quantities, numbers, categories, etc.) or other specific information should be interpreted as illustrative for discussing example embodiments. Such specific information is not provided to limit example embodiment.

What is claimed is:

1. A method for conducting an imperative removal of data records among peers of a blockchain system, the method comprising:
    storing, by a first peer of the peers of the blockchain system, a data record to its designated data storage system, wherein each peer of the peers maintains its own copy of a blockchain;
    storing, by each peer of the peers, a cryptographic hash pointer as a data item in a first block of its own copy of the blockchain, the cryptographic hash pointer pointing to the data record in its designated data storage system;
    receiving, by the first peer, an instruction to delete the data record stored in the designated data storage system;
    in response to receiving the instruction to delete the data record:
        storing, by the first peer, a deletion item in a block of a first blockchain maintained by the first peer, wherein the deletion item indicates the data record is marked for deletion from the designated data storage system;
        transmitting, by the first peer, a command to the designated data storage system to delete the data record; and
        broadcasting information indicating the deletion item stored in the block of the first blockchain from the first peer to other peers;
    storing, by each of the other peers, the deletion item in a second block of its own copy of the blockchain the deletion item indicating that the data record is marked for deletion; and
    transmitting, by the designated data storage system, information indicating the data record previously existed but has been deleted from the designated data storage system in response to queries for the data record received from one or more other peers of the peers during a transient period corresponding to an amount of time for asynchronous storing of the deletion item in the second block of the copies of the blockchains maintained by each of the peers.

2. The method of claim 1 further comprising:
    returning, by each peer of the peers, upon receiving a query request for the data record, a response indicating that the data record was removed and is not available in the designated data storage system when the deletion item for the data record is found on the blockchain.

3. The method of claim 1 further comprising:
    searching, by each peer of the peers, upon receiving a query request for a particular data record, a particular data item referencing the particular data record, wherein the searching starts from a last block of the blockchain and searches towards a genesis block of the blockchain.

4. The method of claim 1, wherein the cryptographic hash pointer has cryptographic hash properties including collision-free and hiding and the cryptographic hash pointer uniquely identifies the data record in the designated data storage system.

5. The method of claim 1 further comprising:
adding, by at least one peer, a removal record in a block of its own copy of the blockchain subsequent to receiving the information broadcast from the first peer and indicating the deletion item stored in the block of the first blockchain, wherein the removal record indicates the data record was removed in the designated data storage system.

6. The method of claim 1 further comprising:
storing, by the first peer, the cryptographic hash pointer for the data record in a state store simultaneously with storing a cryptographic hash pointer for the data record in the designated data storage system, wherein the state store is a database, wherein each cryptographic hash pointer uniquely identifies the data record in the designated data storage system and the state store.

7. The method of claim 6, wherein the data record is a latest record so that the state store can provide the cryptographic hash pointer for the latest record upon query.

8. The method of claim 1, wherein the blockchain is a public blockchain which can be read by a general public.

9. A method for conducting an imperative removal of a dataset among peers participating to a blockchain system, the method comprising:
depositing, by at least one peer, a dataset to its designated data storage system, wherein the dataset comprises a plurality of data records, wherein each peer participating to a blockchain system has its own copy of a blockchain;
storing, by each peer of the peers, a cryptographic hash pointer as a data item in a first block of its own copy of the blockchain, the cryptographic hash pointer pointing to the dataset in its designated data storage system;
receiving, by a first peer, a deletion request including an instruction to delete the dataset stored in the designated data storage system;
in response to receiving the instruction to delete the dataset:
storing, by the first peer, a deletion item in a block of a first blockchain maintained by the first peer, wherein the deletion item indicates the data record is marked for deletion from the designated data storage system;
transmitting, by the first peer, a command to the designated data storage system to delete the data record; and
broadcasting information indicating the deletion item stored in the block of the first blockchain from the first peer to other peers, wherein,
each of the other peers stores the deletion item in a second block of its respective copy of the blockchain, the deletion item indicating that all of the data records in the dataset are marked for deletion; and
transmitting, by the designated data storage system, information indicating the dataset previously existed but has been deleted from the designated data storage system in response to queries for data records of the dataset received from one or more other peers of the peers during a transient period corresponding to an amount of time for asynchronous storing of the deletion item in the second block of the copies of the blockchains maintained by each of the peers.

10. The method of claim 9 further comprising:
returning, by each peer of the peers, upon receiving a query request for the data record of the dataset, a response that indicating the data record was removed and is not available in the blockchain system when the deletion request for the data record is found on the blockchain.

11. The method of claim 9, wherein the designated data storage system is shared among the peers.

12. The method of claim 9 further comprising:
searching, by each peer of the peers, upon receiving a query request for a particular data record of the dataset, the blockchain for a data item referencing the particular data record, wherein the search starts from a last block of the blockchain and searches towards a genesis block of the blockchain.

13. The method of claim 9 further comprising:
receiving, by a central administration module from the peers, a removal confirmation indicating the dataset was removed from each of the peers; and
adding, by the central administration module, a removal record in a block of the blockchain, wherein the removal record indicates that the data record was removed from the designated storage system.

14. An information processing system comprising:
at least one data storage system comprising a memory storing a plurality of digital records;
at least one blockchain system comprising a plurality of peers, each peer of the plurality of peers comprising a computing device having a processor and a memory and storing, at the memory, a blockchain including a first block and a second block, the first block storing a cryptographic hash pointer as a data item pointing to the digital records in the at least one data storage system and the second block storing a deletion item indicating that the digital records are marked for deletion from the at least one data storage system, wherein the first block precedes the second block in the blockchain;
a processor and a memory storing instructions and in electronic communication with the processor, the processor being configured to execute the instructions to:
delete the digital record from the at least one data storage system upon identifying the deletion item in the blockchain;
receive delete confirmation messages from peers supported by the at least one blockchain system, the delete confirmation messages indicating the digital record has been deleted; and
in response to receiving the confirmation messages from all peers supported by the at least one blockchain system, record, to a third block of the blockchain, a removal data item comprising information confirming the digital record existed in the at least one data storage system and has been deleted.

15. The information processing system of claim 14 further comprising:
a state store that stores a key and provides a cryptographic hash pointer for a latest digital record.

16. The information processing system of claim 14, wherein the blockchain is a public blockchain which can be read by a general public.

17. The at least one data storage system of claim 14, wherein the digital records comprise a plurality of data records.

18. The information processing system of claim 14, wherein the at least one at least one data storage system is shared among peers, each peer has its own copy of the blockchain.

19. The at least one data storage system of claim 18 further comprising:
   a central administration module configured to remove the digital record in the at least one data storage system, and reply a removal confirmation to each peer of the plurality of peers that issues the removal confirmation, indicating that the digital record was removed in the at least one data storage system.

* * * * *